June 13, 1944.  E. L. MILLER ET AL  2,351,357
BEARING FOR ROCK BITS
Filed Sept. 30, 1942  2 Sheets-Sheet 2
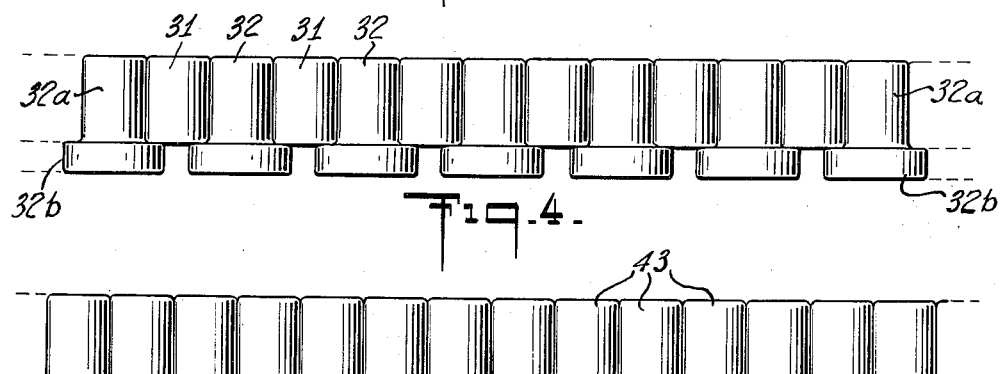
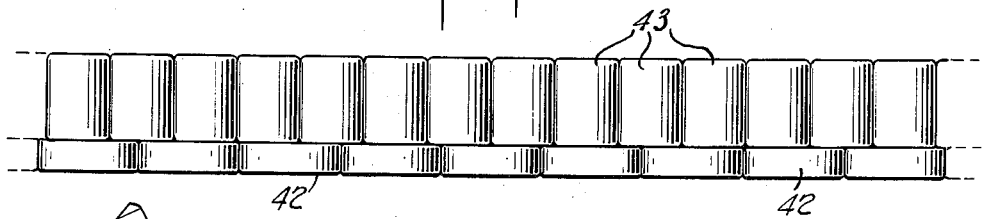
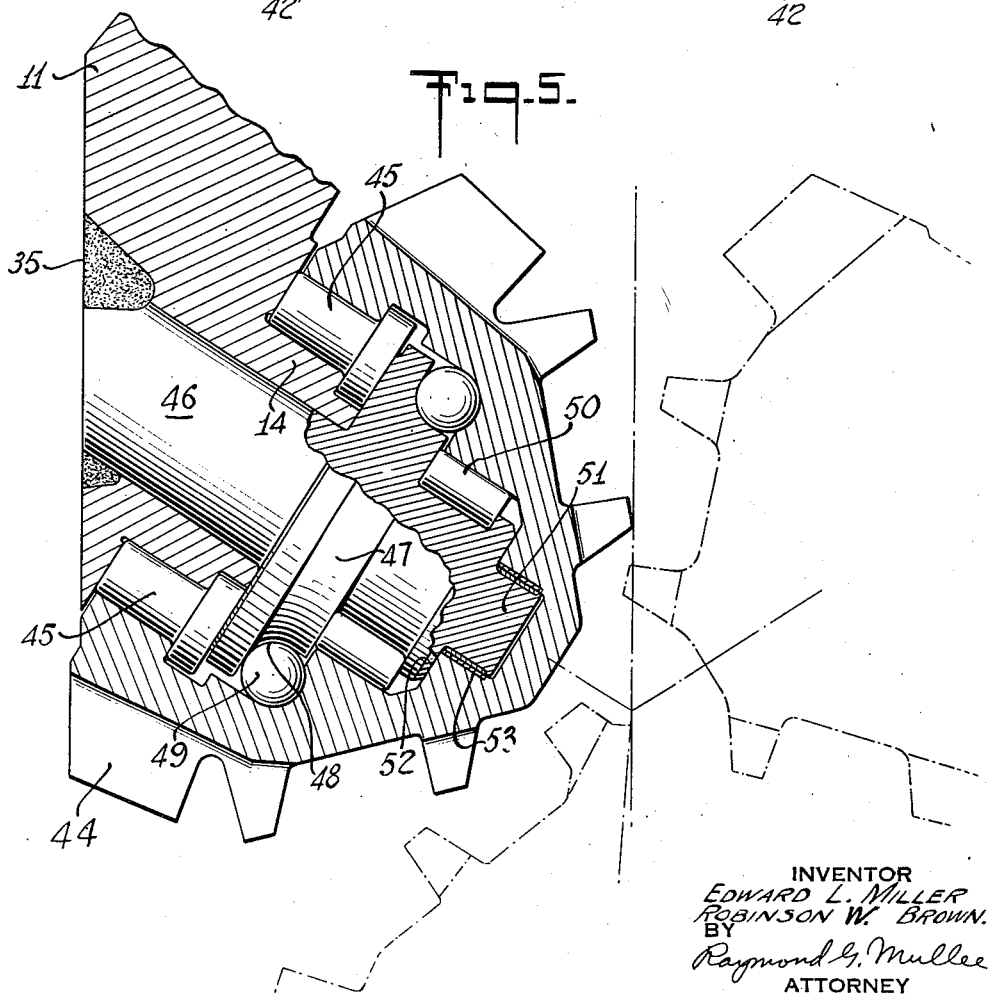
INVENTOR
EDWARD L. MILLER
ROBINSON W. BROWN.
BY
Raymond G. Mullee
ATTORNEY Patented June 13, 1944

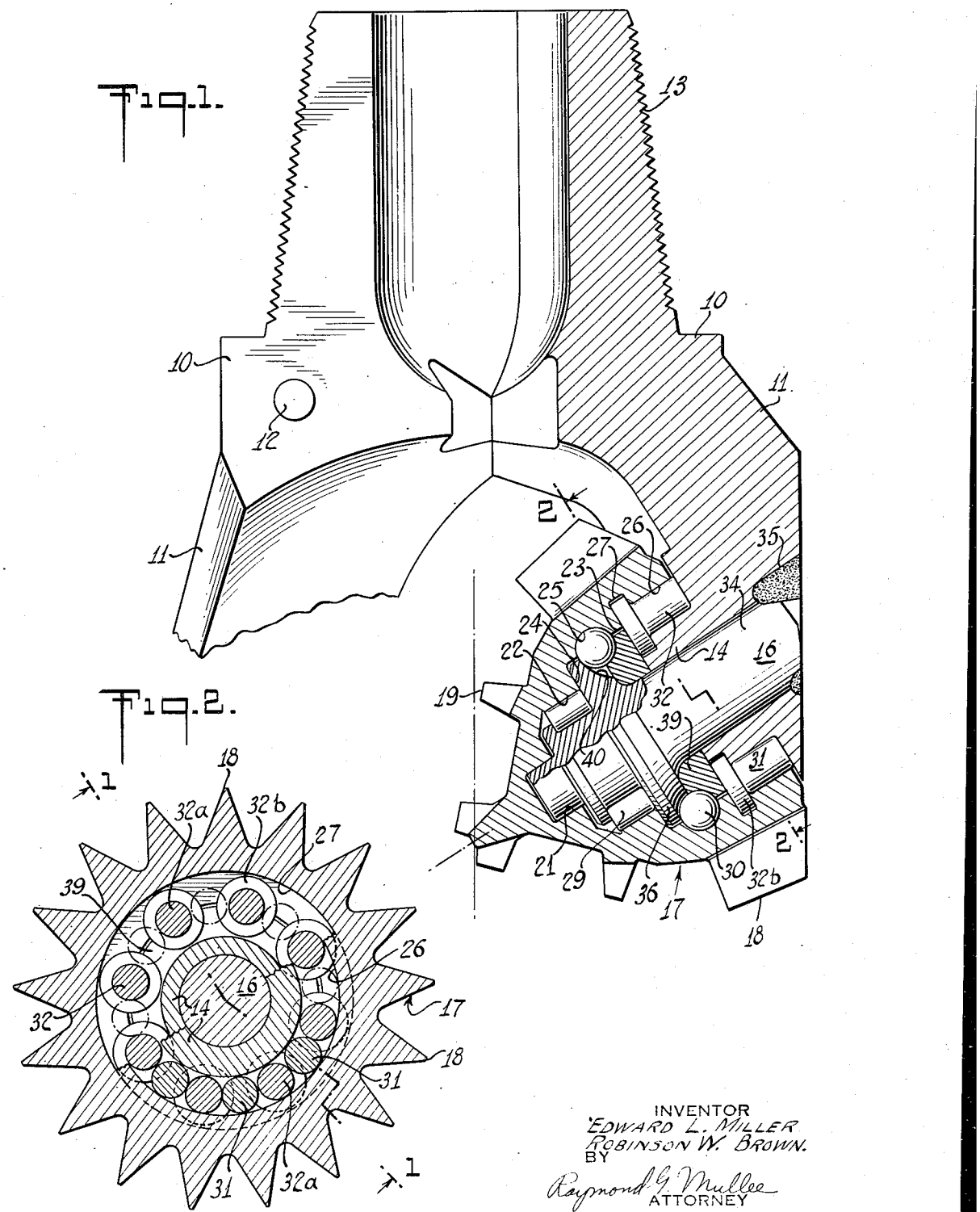

2,351,357

UNITED STATES PATENT OFFICE 2,351,357

BEARING FOR ROCK BITS

Edward L. Miller and Robinson W. Brown, Oklahoma City, Okla., assignors to Chicago Pneumatic Tool Company, New York, N. Y., a corporation of New Jersey Application September 30, 1942, Serial No. 460,202

11 Claims. (Cl. 308—174)

This invention relates to rotary drill bits for boring oil and gas wells and more particularly to anti-friction bearings for mounting roller cutters of the conical type.

Among the objects of the invention are: to arrange the rolling bearings for maximum effectiveness in sustaining operating thrusts; to insure free rotation of the cutter under all operating conditions; to minimize the danger of damage to the bearings; and to positively prevent detachment of the cutter from the drill in the event that the ordinary cutter retainer means becomes impaired.

A feature of the invention resides in a novel locking means for the cutter, consisting of cylindrical rollers preferably used in combination with a ball retainer and adapted to inhibit any substantial movement of the cutter toward the free end of the spindle.

Other objects and features of the invention will appear more clearly from the description which follows.

In the accompanying drawings:

Fig. 1 is a longitudinal section of a part of a rock bit embodying the preferred form of bearing, the section being taken as indicated by the broken line 1—1 in Fig. 2;

Fig. 2 is a cross section through the bearing as indicated by the broken line 2—2 in Fig. 1;

Fig. 3 is a development of a part of the row of retainer rollers together with the associated spacer rollers;

Fig. 4 is a development of a modified arrangement of rollers which may be substituted for those illustrated in Fig. 3; and Fig. 5 is a longitudinal section of a modified bearing.

Figs. 3, 4 and 5 are drawn to a larger scale than Figs. 1 and 2.

The invention is illustrated as embodied in a three cone bit although applicable to rock bits comprising a fewer or greater number of cutters. The bit is driven about its central vertical axis by means of a drill stem (not shown). The bit head, which is of conventional form is divided into three longitudinal sections 10, each having a downwardly and outwardly extending leg 11, the three legs defining a recess therebetween in which the roller cutters are received. The three sections may have dowels 12 on their contacting faces to align them during assemly, the sections then being welded together, or held together by screwing the upper threaded portions 13 thereof within a drill collar or tool joint, not shown. The lower end of each leg 11 is integrally connected with an annular shaft 14 extending downwardly and inwardly toward the axis of revolution of the bit. The axes of these shafts lie in vertical planes 120 degrees apart. The shaft 14 complements a removable cutter pin 16 to provide a spindle for a roller cutter 17. The cutter periphery has two frusto-conical portions tapered at different angles as a result of which the cutter engages the earth formation with a non-true rolling action. The surface of the cutter is divided by circumferential and longitudinal grooves forming rows of teeth with radial cutting edges. The cutter has a row of teeth 18 at the base portion thereof which cuts an area extending inwardly from the side wall of the bore hole and overlapping a corresponding area cut by each of the adjacent cutters. The apex portion of the cutter comprises a plurality of rows of teeth 19 adapted to interfit with complementary rows of teeth on adjacent cutters, each interfitting row extending into a circumferential groove on another cutter or cutters to provide a self-cleaning action and also to permit the use of cutters of a relatively large size in a given space. A suitable arrangement of teeth is illustrated in Fig. 5 which shows the teeth of one cutter in full lines and the teeth of the two complementary cutters in broken lines.

The interior surface of the cutter 17 comprises a cylindrical bore 21 near the apex or closed end of the cutter, a cylindrical counterbore 22, a second counterbore 23, an annular radial friction bearing surface or shoulder 24 connecting said counterbores, an arcuate recess 25 extending circumferentially of said second counterbore, a third counterbore 26 at the outer or base end of the cutter, and a cylindrical recess 27 at the inner end of the third counterbore.

The cutter rotates about a set of rolling bearings which comprises a row of cylindrical rollers 29 near the nose of the cutter and engaging the first counterbore 22; a row of ball bearings 30 engaging the arcuate recess 25; and a base row of rollers engaging the outermost counterbore 26. The row at the base of the cutter consists of cylindrical rollers 31 alternating with retainer rollers 32 and acting as spacers for the latter. The retainer rollers have a cylindrical portion 32a engaging the cutter surface 26 for sustaining radial loads in cooperation with the spacer rollers 31. In addition they have an integral head 32b providing a disk-like portion extending into the cutter recess 27 for a purpose hereinafter described. The inner faces of the heads 32b are flush with the inner extremity of shaft 14 which constitutes the stationary part of the spindle.

The cutter pin 16 constitutes the removable or terminal section of the spindle. It is made of one piece and comprises a cylindrical stem 34 received within the annular shaft 14 and secured thereto by welding material 35; a flange 36 spaced from the inner end of the shaft 14; an extension having cylindrical bearing surfaces cooperating with rollers 29; and a cylindrical pilot portion at the free end of the cutter pin which frictionally engages the cutter bore 21. The inner face of the flange 36 provides a friction shoulder complementing cutter shoulder 24 to sustain outward thrusts of the cutter relative to the spindle. The outer face of the flange 36 abuts against thrust washer 39 to hold it securely against the extremity of shaft 14. The flange 36 and the washer 39 have registering arcuate recesses providing a raceway for ball bearings 30. The upper end of the flange has a ball groove 40 which permits insertion of the balls in the cutter raceway 25 during assembly of the parts of the bearing.

In operation, the bit head 10 revolves about a vertical axis, carrying with it the spindle shafts 14. The cutters 17 rotate about the axes of the shafts due to the traction between the teeth 18, 19 and the bottom of the bore hole. The action on the earth formation is not one of true rolling motion, however, since the shape and mounting of the cutter are such that the radius or the circumference of any given portion is not uniformly proportional to the circumference of the individual path over which it rolls. The disproportion manifests itself in a forward scraping action at some parts of the cutter surfaces and a backward scraping action at other parts, whereby the cutter engages the earth with a twisting or screw driver action. This tends to misalign the cutter and spindle axes.

Due to the weight of the drill bit and superstructure, particularly the drill stem, the bearings sustain an average pressure of several tons. The maximum instantaneous force transmitted through the bearings is much higher, however, because the weight does not rest on the bearings uniformly but is transmitted in the form of shocks due in part to the uneven surface at the bottom of the hole. Any lost motion between the cutter and spindle, due to looseness in the bearings, magnifies the shocks and tends to result in a destructive hammering action of the spindle on the bearings. In prior constructions employing ball bearings for retainers, the balls are sometimes deformed or damaged to such an extent that they fail to retain the cutter. When the cutter becomes detached from the spindle it inhibits further drilling, thereby requiring an expensive "fishing" operation and occasionally resulting in a lost well.

The invention provides means for minimizing the effects of shocks on the bearings, and more particularly for preventing detachment of the cutter in the event that the ball bearing retainers are damaged and cease to function. Radial components of the thrusts between the cutter and the spindle are sustained mainly by the cylindrical heel rollers 31, the cylindrical portions 32a of the retainer rollers 32, and the cylindrical nose rollers 29. The ball bearings 30 and the pilot portion engaging the frictional surface 21 at the nose of the cutter also contribute toward this end. The axial thrust components, which extend in opposite directions, are of considerably less magnitude than the radial components. The outward axial thrusts are sustained by balls 30, preferably supplemented by friction shoulder 24. The inward axial thrusts which tend to separate the cutter from the spindle are normally taken by the balls 30. Should the balls become damaged, however, the heads 32b on the retainer rollers 32 will function to provide a positive lock for preventing substantial inward movement of the cutter. The rollers are relieved of all, or substantially all, axial or endwise thrusts.

In assembling the parts of the bearing arrangement, the nose rollers 29 are placed in position on the cutter pin 16 which is then inserted into the bore of the cutter 17. The balls 30 are passed through the groove 40 into the annular recess or raceway 25 in the cutter. Next, the washer 39 is sleeved over the stem of the pin 16. The locking rollers 32 and spacing rollers 31 are inserted into the cutter in the order named. The assembly is then ready to be moved axially into operative relation with the shaft 14 and welded to the bit head section 10. The three sections may then be welded together to form a unit for attachment to the drill stem.

From the foregoing description it is apparent that the set of retainer balls 30 and the set of retainer rollers 32 cooperate to produce results not obtainable by either set alone. The balls are more effective than the rollers during normal conditions because they provide a close, yet substantially frictionless, fit between the cutter and spindle, with relative axial movement minimized. The rollers on the other hand, become effective in the event of impairment of the retainer function of the balls.

Fig. 4 shows, in development, part of a modified row of base rollers which may be substituted for those shown in Fig. 3. In the modification, the large diameter rollers 42 correspond in shape and in function to the heads 32b of rollers 32, but they are separate from the smaller rollers 43. The latter conform in shape with the rollers 31 of Fig. 3.

Fig. 5 shows a modified bearing arrangement which employs rollers as the sole means for holding the cutter 44 on the spindle, even during normal conditions of operation. The retainer rollers 45 are illustrated as of the type shown in Fig. 3 although the arrangement of Fig. 4 could be substituted. The cutter pin 46 is shaped to fit the shaft 14 and has a flange 47 abutting tightly against the extremity of the shaft and loosely against the inner faces of rollers 45. The inner face of the flange has an arcuate recess 48 providing a raceway for ball bearings 49. The raceway is so shaped that the balls transmit thrusts from the cutter to the pin 46 in a radial direction and in an outward axial direction. The balls, however, do not resist inward axial movement of the cutter 44 relative to the spindle as in the case of the retainer balls 30 in Fig. 1. Projecting inwardly from the flange 47, the pin 46 has a raceway for receiving cylindrical roller bearings 50 and has a pilot portion 51 at its free end. The cutter 44 has ball and roller raceways complementing the spindle raceway and engaging the respective rolling bearings. It has a shoulder 52 frictionally engaging the spindle to supplement the action of balls 49 in taking outward axial thrusts. It also frictionally engages the pilot portion 51 on the cutter pin 46. To reduce wear along this area, the pilot portion and the interior of the nose end of the cutter may be recessed to receive hard facing material 53, such as tungsten carbide.

From the foregoing description it is apparent that the present invention provides a safety means for locking the cutter against separation during adverse operating conditions, without sacrificing any of the functions performed during normal operating conditions by conventional bearings not equipped with a safety locking means.

What is claimed is:

1. An earth boring drill comprising a spindle and a bearing arrangement for mounting a roller cutter on the spindle, said bearing arrangement comprising one or more rows of cylindrical roller bearings for sustaining radial thrusts, friction bearing surfaces and ball bearings for sustaining axial thrusts, and means for locking the cutter on the spindle, said locking means comprising rollers having locking portions of disk shape adapted to be received within complementary recesses in said cutter and spindle, said cylindrical locking rollers being arranged to abut against the ends of some of said cylindrical thrust rollers.

2. An earth boring drill comprising a spindle supported at one end, the other end being free, a row of balls seated in a raceway in the spindle for retaining a roller cutter on the spindle, and an auxiliary retainer operable upon failure of said balls to function, said auxiliary retainer comprising cylindrical rollers loosely received within complementary recesses in the cutter and spindle, said balls closely fitting their associated raceways whereby normally to relieve the rollers of axial thrusts of the cutter and to sustain a portion of the radial thrusts.

3. In an earth boring drill, a hollow shaft adapted to be supported by a rotatable bit head and to extend inwardly therefrom, a cutter pin having a stem received within said shaft and a flange positioned inwardly of said shaft, a thrust washer surrounding the stem and held firmly between the flange and the inner extremity of the shaft, means for securing the pin to the shaft whereby the shaft, washer and pin in effect constitute a sectional spindle for a roller cutter, roller bearings for sustaining radial thrusts of the cutter, and a plurality of means for retaining the cutter against separation from the spindle, said retaining means comprising balls closely fitting complementary arcuate recesses in the cutter pin and washer, and locking rollers loosely received within complementary recesses in the cutter and shaft.

4. In an earth boring drill, a hollow shaft adapted to be supported by a revoluble bit head and to extend downwardly therefrom and inwardly toward the axis of revolution of the drill, said shaft providing a section of a spindle, a spindle terminal section removably connected to the shaft, said terminal section having a stem fitting within said shaft and having a flange inwardly of the shaft, said spindle being adapted for mounting a roller cutter thereon, and a plurality of retainers for locking the cutter against inward movement relative to the spindle, one of said retainers comprising a row of balls and complementary ball raceways on the cutter and terminal section, and the other of said retainers comprising rollers received within complementary recesses on the cutter and shaft.

5. In an earth boring drill, a revoluble spindle carried thereby and adapted for rotatably mounting a cutter thereon, and a plurality of retainers for locking said cutter against axial movement relative to the spindle, one of said retainers comprising a row of ball bearings closely fitting complementary arcuate raceways on the cutter and spindle, and the other of said retainers comprising cylindrical rollers loosely received within complementary recesses in the cutter and spindle and operable in the event of damage to the ball bearing retainer.

6. In an earth boring drill, a spindle supported at its outer end, the inner end being free, said spindle being adapted for mounting a roller cutter thereon, and a plurality of retainers for locking said cutter against separation from the spindle, one of said retainers comprising a row of ball bearings arranged for closely fitting complementary arcuate raceways on the cutter and spindle, and the other of said retainers comprising cylindrical rollers adapted to be loosely received within complementary recesses in the cutter and spindle and operable in the event of damage to the ball bearing retainer.

7. In an earth boring drill, a spindle, a bearing arrangement for supporting a roller cutter on the spindle, said bearing arrangement comprising friction bearing surfaces and two spaced rows of cylindrical roller bearings for sustaining radial forces, a row of ball bearings intermediate said cylindrical rollers for retaining said cutter on the spindle, and a supplementary locking means for retaining said cutter in the event of failure of the ball bearings to function.

8. An earth boring drill comprising a revoluble spindle supported at its outer end, said spindle being adapted for cooperation with a roller cutter, retainer rollers for securing the cutter against separation from the spindle in an inward direction, said retainer rollers having heads adapted to be received within complementary recesses in the cutter and spindle, characterized in that said retainer rollers have integral extensions of smaller diameter than said heads for cooperation with complementary cutter and spindle raceways to sustain radial thrusts of the cutter.

9. An earth boring drill according to claim 8 in which said roller extensions are alternately arranged in a row with cylindrical spacer rollers of the same diameter as said extensions, the ends of which abut against the heads of the retainer rollers.

10. In an earth boring drill, a shaft supported at its outer end, said shaft having a cylindrical raceway and having an annular recess adjacent said cylindrical raceway, a set of retainer rollers each comprising a head received within said recess and a cylindrical stem providing a roller bearing engaging said raceway, said rollers being adapted for cooperation with a roller cutter having a complementary raceway supporting said roller bearings and having a recess registering with the shaft recess to receive the heads of the retainer rollers, whereby to secure the cutter against inward axial movement relative to the retainer rollers, and detachable means for securing the retainer rollers against inward axial movement relative to the shaft.

11. In an earth boring drill, a shaft supported at its outer end, the inner end being free, said shaft having a cylindrical raceway adjacent its outer end and having an annular recess adjacent the free end of the shaft, a set of retainer rollers each comprising a cylindrical head received within said recess and a cylindrical stem providing a roller bearing engaging said raceway, said rollers being adapted for cooperation with a roller cutter having a complementary raceway supporting said roller bearings and having a recess registering with the shaft recess to receive the heads of the retainer rollers, whereby to secure the cutter against inward axial movement relative to the retainer rollers, and a cutter pin having a stem portion fitting within the shaft for detachable engagement therewith and having a retainer flange outside said shaft and within the cutter, whereby to secure the retainer rollers against inward axial movement relative to the shaft.

EDWARD L. MILLER.
ROBINSON W. BROWN.